No. 650,058. Patented May 22, 1900.
J. M. WILLIAMS.
COMBINATION RACK.
(Application filed Jan. 25, 1899.)
(No Model.)
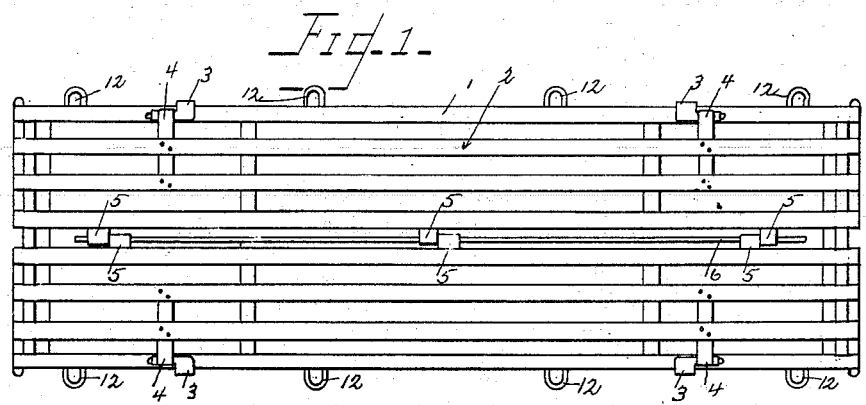
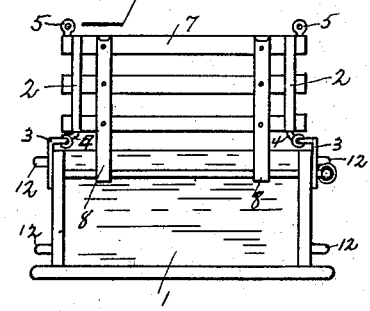
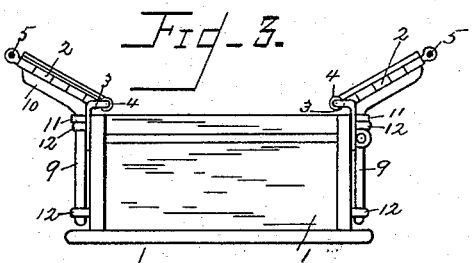
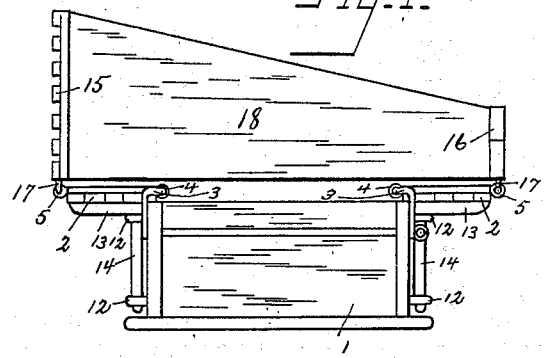
Witnesses
L. G. Hagin.
C. M. Hall
Inventor
John M. Williams
By N. B. Hagin atty.

UNITED STATES PATENT OFFICE.

JOHN M. WILLIAMS, OF COLDWATER, KANSAS.

COMBINATION-RACK.

SPECIFICATION forming part of Letters Patent No. 650,058, dated May 22, 1900.

Application filed January 25, 1899. Serial No. 703,361. (No model.)

*To all whom it may concern:*

Be it known that I, JOHN M. WILLIAMS, a citizen of the United States of America, residing at Coldwater, in the county of Comanche and State of Kansas, have invented certain new and useful Improvements in Combination-Racks, of which the following is a specification, reference being had therein to the accompanying drawings, and the figures of reference thereon, forming a part of this specification, in which—

Figure 1 is a top plan of my improved combination-rack, showing it as it appears as a poultry-rack. Fig. 2 is an end view of said rack when used as a hog-rack. Fig. 3 is an end view of the hay-rack, and Fig. 4 is an end view of the header-box.

This invention relates to certain improvements in combination-racks; and it consists of a poultry, hog, and hay rack, and header-box; and the object is to produce a rack that can be changed from one to the other easily and quickly.

Referring to the drawings, 1 represents an ordinary wagon-box. 2 represents slatted sides which are hinged to the top edge of said sides by the hinges 3 and 4. 5 represents loops, which form part of a hinge. 6 represents a rod which passes through said loops, fastening said sides 2 together when used as a poultry-rack, as shown in Fig. 1. 7 represents a slatted end-gate, which is used in connection with said wagon-box 1 and sides 2, forming a hog-rack, said sides 2 being straightened up, resting on the hinges 3 and 4, as shown in Fig. 2. 8 represents slats for securely holding said end-gate in place. 9 and 10 represent brackets on which said sides 2 rest when used as a hay-rack. Said brackets are provided with collars 11 on the arm 9, said arm 9 passing through the loops 12, which are secured to the sides of the wagon-box 1. 13 and 14 represent another set of brackets made on a right angle to hold said sides 2 down on a level, as shown in Fig. 4, through the medium of the hinges 3 and 4, the arms 14 passing through said loops 12. 15 and 16 represent the high and low sides of a header-box, the sides 2 forming a portion of the bottom. 17 represents the portion of the hinge connecting with the portion 5 of said hinge. 18 represents the ends of said header-box.

This combination-rack is used in the following manner: When said rack is used as a poultry-rack, the sides 2 are laid down on the top of the box 1 and are held together by the rod 6, passing through the loops 5. If a hog-rack is desired, said sides 2 are straightened up to a vertical position, as shown in Fig. 2, and the end-gate 7 put in place. In forming a hay-rack said sides 2 are let down on the angle-brackets 9 and 10, which hold said sides 2 in the desired position, and to form a header-box said brackets 9 and 10 are removed from said loops 12 and the right-angle brackets 13 and 14 put in, and said sides 2 are let down on said right-angle brackets. The sides 15 and 16 are then secured to said sides through the medium of the hinges 5 and 17, and the ends 18 are then put in place. These can all be easily and quickly removed, leaving a plain wagon-box.

Having thus described my invention, what I claim as new and useful, and desire to secure by Letters Patent, is as follows:

1. A combination-rack consisting of the combination of a wagon-box with solid sides, slatted sides hinged to the top edge of said solid sides, loops secured to the top edge of said slatted sides, supplementary sides of different width, loops secured to the bottom edge of said supplementary sides, said loops on said sides and supplementary sides forming hinges, end pieces wider at one end than the other connecting said supplementary sides substantially as shown and described.

2. The combination-rack forming a poultry-rack consisting of the combination of a wagon-box with solid sides, slatted sides hinged to the top edge of said solid sides adapted to be turned down on the top of said solid sides, loops secured to the top edge of said slatted sides and a long rod adapted to pass through said loops substantially as shown and described.

JOHN M. WILLIAMS.

Witnesses:
GEO. H. MCCLAIN,
W. K. LUCAS.